Patented Nov. 1, 1949

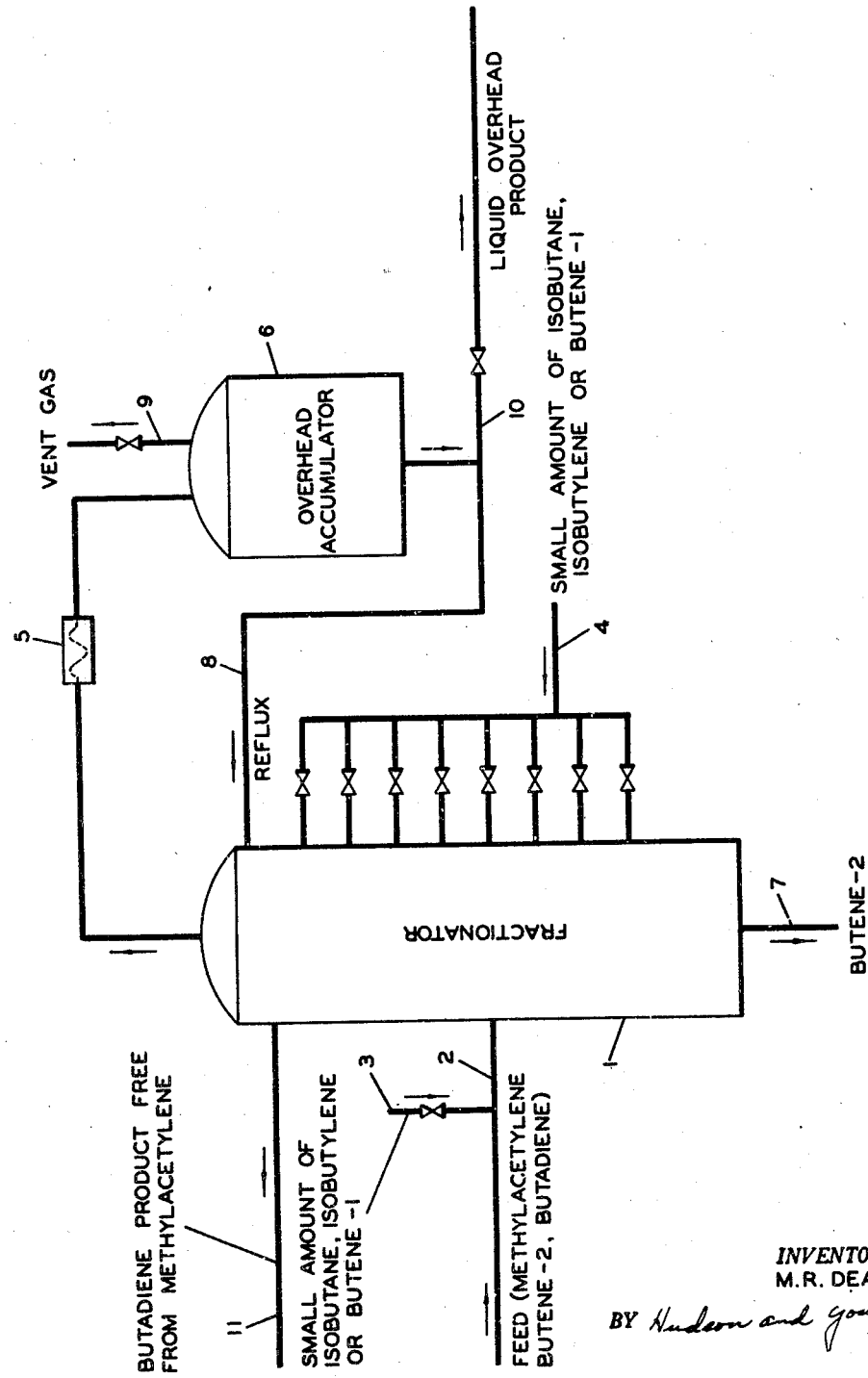

2,486,929

UNITED STATES PATENT OFFICE 2,486,929

AZEOTROPIC DISTILLATION OF METHYL ACETYLENE FROM BUTADIENE

Maurice R. Dean, Bartlesville, Okla., assignor to Phillips Petroleum Company, a corporation of Delaware Application March 14, 1946, Serial No. 654,439

17 Claims. (Cl. 202—42)

This invention relates to the separation of hydrocarbons and especially to the manufacture of butadiene and more particularly to a method of separating pure butadiene from a stream containing the same and methylacetylene. Still more particularly it relates to a method of separating pure butadiene from a stream containing the same in admixture with methylacetylene and at least one hydrocarbon which is less volatile than butadiene but readily separable from butadiene by straight fractional distillation, almost invariably butene-2. Even more particularly it relates to a method of the foregoing type wherein the separation of pure butadiene from methylacetylene and from hydrocarbons less volatile than butadiene, usually butene-2, is effected in a single fractionator and with a single fractional distillation.

Rubber synthesis requires a butadiene product not only as pure as possible but also as free as possible of traces of material deleterious to the synthesis operations or to the quality of the rubber produced. In certain processes for the manufacture of butadiene, especially those involving the catalytic dehydrogenation of normal butenes, small quantities of methylacetylene appear in the products of reaction. The quantities present are ordinarily of such low magnitude as to be termed "trace impurities." However, in commercial operations conditions occur which cause methylacetylene to increase to an undesirable concentration in the feed charged to the fractionator in which butadiene is separated from less volatile hydrocarbons.

Conventional butadiene purification provides for the methylacetylene removal in conjunction with the removal of other light impurities, namely $C_3$ and lighter components such as propane, etc. by vapor recovery and/or depropanizing steps. U. S. Patent 2,371,860 to W. S. Walls and M. R. Dean is directed to removal of methylacetylene from $C_4$ hydrocarbons by distillation in the presence of propane whereby the methylacetylene is taken overhead in the form of an azeotrope with the propane. U. S. Patents 2,386,310 and 2,415,006 to K. H. Hachmuth disclose a method of recovering essentially pure butadiene from a mixture of $C_3$ and $C_4$ hydrocarbons which comprises the steps of (1) depropanizing the stream which usually issues from a compression system and/or a mineral seal absorption system for elimination of $C_2$ and lighter components and some of the $C_3$, (2) passing the depropanized stream to a second fractional distillation column which separates it into an overhead fraction containing all of the components lighter than butene-2 and a portion of the butene-2 and a bottoms fraction containing the rest of the butene-2 and any heavier components including $C_4$ acetylenes and $C_5$ and heavier (3) passing the overhead product thus obtained into an absorber wherein it is subjected to extractive distillation with furfural or the like as the solvent, whereby the butadiene and butene-2 content are selectively dissolved in the furfural and thereby separated from an overhead fraction containing n-butane, isobutane, butene-1, isobutylene and part of the butene-2, (4) stripping the rich solvent and (5) passing the stripper overhead product composed of butadiene and butene-2 together with any methylacetylene and $C_4$ acetylene which were present in the feed to the furfural absorber to a butadiene product column in which essentially pure butadiene is separated from butene-2.

Frequently for various reasons the operation of the vapor recovery system and/or the depropanizer may be such that it does not effect complete removal of methylacetylene with the result that the final butadiene product will not meet specifications with respect to methylacetylene content. U. S. Patent 2,434,923, issued January 27, 1948, to K. H. Hachmuth, is directed to a method of accomplishing separation of methylacetylene from butadiene in the same fractionator wherein butadiene is separated from less volatile hydrocarbons principally butene-2. The present application is directed to an improvement over the mode of operation disclosed in said application.

The copending application just mentioned discloses a process of separating essentially pure butadiene from a hydrocarbon mixture containing the same and also containing butene-2 and a small amount of methylacetylene in a fractionating column, withdrawing a bottom product of butene-2 and an overhead vapor of butadiene and methylacetylene, partially condensing the overhead, withdrawing the uncondensed overhead vapor which is enriched with methylacetylene, refluxing the top of the column with the liquid condensate, and withdrawing liquid product butadiene as a sidestream from a point in the column between the points of entry of the feed and the reflux. For example, where a 120-tray column is used, the liquid butadiene product may be withdrawn at the 112th tray. This mode of operation enables the product butadiene to meet specifications even during periods when the methylacetylene concentration in the feed is abnormally high as a result of improper separation in the depropanizing step. In a specific aspect the present invention is an improvement over the process described in said Hachmuth application.

The principal object of my invention is to provide an improved process for separating methylacetylene from butadiene. Another object is to make possible a separation between methylacetylene and butadiene while separating butadiene from less volatile hydrocarbons especially butene-2, thus effecting the production of high quality butadiene without requiring resort to further processing for methylacetylene removal. Another object is to effect the removal of methylacetylene in the same fractionation column wherein butadiene is separated from butene-2, thereby eliminating the necessity for additional equipment. Another object is to effect the removal of methylacetylene in an even more satisfactory and positive manner than is the case when the invention described in U. S. Patent 2,434,923 is employed. Another object is to provide a method whereby the relative volatility of methylacetylene is considerably enhanced whereby it is forced increasingly into the extreme upper portion of the column with the result that the product butadiene which is taken off as a side stream is much more free from objectionable methylacetylene than would be the case with conditions otherwise identical and as set forth in U. S. Patent 2,434,923 except without the application of the present invention. Another object is to provide a process as in the preceding object which enables the product butadiene to be drawn off at a point even nearer the top of the column and still meet specifications as to methylacetylene content and at the same time be even more free from material higher-boiling than butadiene particularly butene-2 and proportionately higher in butadiene content.

The accompanying drawing portrays diagrammatically one arrangement of equipment which may be used in carrying out the present invention.

I have now found that in the separation of butadiene from a mixture containing same together with methylacetylene and at least one hydrocarbon less volatile than butadiene, particularly butene-2, by fractionally distilling said mixture in a single fractionating column, withdrawing a bottoms product containing said less volatile hydrocarbon and an overhead product containing methylacetylene and butadiene and withdrawing liquid butadiene product as a side stream from a point in said column intermediate the points of feed and reflux entries, improved results are obtained if said distillation is conducted in the presence of an aliphatic $C_4$ hydrocarbon which boils below butadiene and is more saturated than butadiene. I have discovered that the addition of such a hydrocarbon effects an increase in the volatility of methylacetylene relative to that of butadiene instead of the decrease which is predicted by accepted methods of calculation with the result that the methylacetylene is concentrated in the extreme upper portion of the column to a considerably greater extent than it would be in the absence of such a hydrocarbon.

In a typical embodiment, the present invention involves carrying out the fractional distillation of a stream containing butadiene, butene-2 and a small amount of methylacetylene in the presence of an aliphatic $C_4$ hydrocarbon more saturated than and boiling below butadiene in an amount greater than the amount of methylacetylene. There are three such hydrocarbons, namely, butene-1, isobutylene and isobutane, boiling at 20.7° F., 19.2° F., and 10.9° F., respectively. By having such a hydrocarbon present during the distillation the volatility of the methylacetylene relative to that of butadiene is increased so that the product butadiene which is drawn off as a liquid side stream is more free from objectionable methylacetylene than would be the case in the absence of such lower-boiling more saturated $C_4$ hydrocarbon.

The more saturated $C_4$ hydrocarbon may be introduced in admixture with the feed or may be introduced to the column at any suitable point other than that of feed entry. For example, it may be introduced at any suitable point or points in the lower or stripping section of the column, i. e., the portion below the feed entry. Alternatively it may be introduced at one or more suitable points in the upper or rectifying or enriching section of the column, i. e., the portion above the feed tray but no higher than the point at which the side stream drawoff is located. It may be injected partly into the upper section and partly into the lower section, with optional simultaneous introduction of a portion with the feed. It is preferred to introduce it either with the feed or into the upper part of the column, for the reason that introducing it into the lower section of the column increases the amount of light hydrocarbon required to be stripped out in the stripping section without offering any compensating advantage. Introduction with the feed and/or at one or a plurality of points in the upper portion of the column serves to effect adequate removal of the methylacetylene from the butadiene product. In some cases it may be preferred to introduce the more saturated $C_4$ hydrocarbon at one or more points located above the point of feed entry but substantially below the point of butadiene product side stream drawoff in order to allow the hydrocarbon to exert its effect on increasing the volatilization of methylacetylene before it reaches the tray from which the liquid butadiene product is withdrawn.

As stated above, the more saturated $C_4$ hydrocarbon operates to increase the equilibrium ratio of methylacetylene in the vapor phase to methylacetylene in the liquid phase with the result that methylacetylene is in the vapor phase to an increased extent, whereas calculation by accepted methods would cause one to expect it to decrease said ratio. It may be that the more saturated $C_4$ hydrocarbon forms an azeotrope or a pseudo-azeotrope or undergoes some sort of loose chemical association or coordination with the methylacetylene. However it is to be distinctly understood that my invention is not to be limited by any theory but is based on the fact that the presence of the more saturated $C_4$ hydrocarbon increases the relative volatility of the methylacetylene.

By actual laboratory experiments, I have verified the marked increase in relative volatility of methylacetylene brought about by the more saturated $C_4$ hydrocarbon. Thus, the vaporization equilibrium constants (K constants) were determined experimentally for the components of the binary mixtures composed of methylacetylene in butadiene-1,3, butene-1, isobutylene, and isobutane at a pressure of 70.0 pounds per square inch absolute. The temperature required to give the binary mixtures a vapor pressure of 70.0 pounds varied from about 90 to about 107° F. The methylacetylene concentration in the liquid phase was approximately 5 mole per cent. A sample of the blend was placed in a closed steel equilibrium cell held under carefully controlled conditions of temperature and pressure and allowed to come to equilibrium between vapor and liquid phases. A sample of the vapor phase was then transferred to a second steel cell in such a manner that disturbance of the equilibrium was prevented during the transfer. This was done by pressuring mercury into the equilibrium cell at the same rate at which the vapor sample was withdrawn into the vapor sample container. A sample of the liquid phase was withdrawn to another sample container in the same manner. The samples were then analyzed. At least two experiments were conducted in order substantially to reduce experimental error. From the analyses the vaporization equilibrium or K constants for both the hydrocarbons in the system were determined. The expected values for the K constants in the systems were calculated by the standard method based on fugacities as described, for example, in Dodge, "Chemical Engineering Thermodynamics," 1944, pages 579–586. As stated by Dodge, the fugacity method of calculating K constants is the best available at present. The fugacity coefficients were obtained from the more recent fugacity coefficient chart appearing in the article "High pressure vapor-liquid equilibiria," by B. W. Gamson and K. M. Watson, National Petroleum News, Technology section, 36 (September 6, 1944). The results of the experiments and calculations are given in the following table. The measured and the calculated values for the K constants can be readily compared from the table.

lower in magnitude than that given by isobutane.

It will be seen that the experimentally determined value for K for methylacetylene in butene-1 is approximately 30 per cent greater than the calculated value, the K for methylacetylene in isobutylene is approximately 36 per cent above the calculated value, and the K for methylacetylene in isobutane is about 75 per cent above the calculated value. This is shown by the divergence of the experimental and calculated values as one reads up the two columns at the right of the table. While these departures from the expected behavior are very significant, the most important factor underlying the present invention is the fact that the experimentally determined values for K for methylacetylene in butene-1, isobutylene and isobutane are considerably greater than that for K for methylacetylene in butadiene. This is shown by subtracting the experimental K value in butadiene, averaging about 1.94, from the corresponding values in butene-1, averaging 2.21, in isobutylene, averaging 2.21 and in isobutane, averaging about 2.49.

While a 5 per cent concentration of methylacetylene in the several $C_4$ hydrocarbons tested was obtained in order to obtain the requisite experimental accuracy, it should be pointed out that the deviations of the K constants from the expected behavior increase as the concentration of methylacetylene is reduced. In ordinary operation the concentration of methylacetylene in the liquid on the trays of the column is much lower

*Determination of K constants for methylacetylene in 5% concentration in isobutane, isobutylene, butene-1 and butadiene-1,3 at 70.0 P. S. I. A.*

| $C_4$ Hydrocarbon | Experimental Data | | | | | Values for Vaporization Equilibrium Constant K for Methylacetylene | |
|---|---|---|---|---|---|---|---|
| | Temp. °F. | Phase Compositions in Mole Per Cent | | | | | |
| | | Liquid Phase | | Vapor Phase | | | |
| | | Methylacetylene | $C_4$ Hydrocarbon | Methylacetylene | $C_4$ Hydrocarbon | Experimental | Calculated |
| Isobutane | 92.2 | 3.74 | 96.26 | 9.37 | 90.63 | 2.51 | 1.45 |
| | 90.0 | 5.26 | 94.74 | 13.04 | 86.96 | 2.48 | 1.39 |
| Isobutylene | 102.2 | 3.41 | 96.59 | 7.73 | 92.27 | 2.27 | 1.68 |
| | 101.1 | 4.47 | 95.53 | 9.62 | 90.38 | 2.15 | 1.63 |
| Butene-1 | 102.0 | 4.71 | 95.29 | 10.72 | 89.28 | 2.28 | 1.68 |
| | 101.9 | 4.97 | 95.03 | 11.06 | 88.94 | 2.23 | 1.68 |
| | 104.3 | 3.00 | 97.00 | 6.35 | 93.65 | 2.12 | 1.72 |
| Butadiene-1,3 | 106.5 | 3.85 | 96.15 | 7.60 | 92.40 | 1.97 | 1.75 |
| | 106.5 | 4.91 | 95.09 | 9.45 | 90.55 | 1.92 | 1.75 |

By inspection of the right-hand column of the table, it will be seen that the calculated value for the K for methylacetylene in butadiene, namely, 1.75, is larger than that for the K for methylacetylene in butene-1, isobutylene and/or isobutane, the difference increasing in the order named. Therefore, it would be expected that the addition of butene-1, isobutylene and/or isobutane to a system of methylacetylene in butadiene would cause the K for the methylacetylene to decrease in proportion to the amount added. This would make the separation more difficult. Actually, however, as is shown by inspection of the experimentally determined values given in the column headed "Experimental," the addition of such more saturated aliphatic $C_4$ hydrocarbon increases the K for the methylacetylene and thereby makes the separation easier. Isobutane shows the most pronounced effect. Isobutylene and butene-1 show nearly equal effects, considerably than 5 per cent. Therefore, the effect of the added more saturated $C_4$ hydrocarbon, namely butene-1, isobutylene or isobutane, in increasing the relative volatility of methylacetylene is even greater at such lower methylacetylene concentrations than is indicated by the experimental work reported above.

It will be understood that the magnitude of the K constant is one of the principal factors in designing a fractionating column for a particular separation. If the K for methylacetylene can be made larger, then fewer trays are required for a given separation. For this reason, particular emphasis has been placed on the values of the K constant.

In the foregoing the equilibrium constant "K" is defined as the mole per cent of a component in the vapor phase divided by the mole per cent in the liquid phase. The temperature and pressure employed in the experimental work reported represent about average conditions in a fractionator handling the hydrocarbons in question.

For reference purposes, below are listed normal boiling points of methylacetylene and of the C₄ hydrocarbons which may be encountered in the practice of the present invention.

Hydrocarbon:

| | Normal Boiling Point, °F. |
|---|---|
| Methylacetylene | − 9.6 |
| Isobutane | +10.8 |
| Isobutylene | 19.6 |
| Butene-1 | 20.7 |
| Butadiene-1,3 | 24.1 |
| Normal butane | 31.1 |
| Butene-2 (low-boiling) | 33.6 |
| Butene-2 (high-boiling) | 38.7 |
| Vinylacetylene | 41.2 |
| Ethylacetylene | 47.8 |
| Diacetylene | 49.6 |
| Butadiene-1,2 | 50.5 |

As used herein the term "butadiene" denotes butadiene-1,3 unless otherwise stated. The term "butene-2" is intended to designate either the low-boiling or the high-boiling isomer or both unless specifically noted to the contrary.

It will be understood that while in the particular feeds referred to herein, butene-2 (both high- and low-boiling) is the component of the feed other than butadiene which is less volatile than butadiene, other less volatile hydrocarbons, such as four carbon acetylenes or hydrocarbons of five or more carbon atoms, may be present in the feed. However hydrocarbons of five or more carbon atoms are almost invariably removed in a fractionation step ahead of the butadiene column. Normal butane is seldom present in the feed because it is usually rejected in the extractive distillation with furfural or equivalent solvent which precedes the butadiene column. Presence of normal butane in the feed is undesirable because it has been reported to form an azeotrope with butadiene. Accordingly I prefer that the process of the present invention be conducted in the substantial or complete absence of normal butane. Isobutane, isobutylene and butene-1 are also rejected by the furfural and so are generally absent from the feed. However one method of operating which I may employ is to adjust the operation of the furfural extractive distillation step so that an amount of isobutylene and/or butene-1 sufficient for the practice of the present invention is dissolved in the furfural and thereby is caused to be present in the feed to the butadiene column operated in accordance with the present invention. This is especially satisfactory in the case of isobutylene and/or butene-1, but is not as satisfactory in the case of isobutane because furfural does not dissolve isobutane to nearly the extent that it dissolves the C₄ olefins. Furthermore, isobutane is seldom present in the original stream from which the feed to the present invention is derived.

Accordingly the feed to the process of the present invention will usually be composed or consist of butadiene and at least one heavier C₄ hydrocarbon such at butene-2 and/or one or more C₄ acetylenes, namely vinylacetylene, ethylacetylene or diacetylene, either singly or in any combination, and a small amount of methylacetylene. While butene-2 has been selected as an example of a hydrocarbon less volatile than butadiene for purposes of illustrating my invention, and while for a number of reasons butene-2 will be the heavier hydrocarbon most frequently encountered in admixture with butadiene in the feed to the final fractionator, my invention is not limited thereto but is equally applicable where it is any other less volatile hydrocarbon such as four carbon atom acetylenes or hydrocarbons having more than four carbon atoms.

In a typical embodiment of my invention the butadiene-containing feed also containing methylacetylene and at least one hydrocarbon less volatile than butadiene, almost invariably butene-2, is fed to the final fractionator commonly employed to separate pure butadiene and is there fractionally distilled in the presence of at least one hydrocarbon selected from the group consisting of isobutane, isobutylene and butene-1 in amount at least sufficient substantially to improve the separation of methylacetylene from butadiene. The bottoms product comprising essentially all of the components of the feed less volatile than butadiene together with a very minor proportion of butadiene is withdrawn as in the common practice. An overhead vapor comprising substantially all of the methylacetylene present in the feed and the major portion or all of the hydrocarbon selected from the group consisting of isobutane, isobutylene and butene-1, together with some butadiene is withdrawn and subjected to at least partial condensation to provide reflux which is fed to the top of the column. From the reflux accumulator there is bled off a vaporous fraction which is enriched with respect to methylacetylene, having a much higher methylacetylene concentration than either the overhead vapor or the reflux. Reduction of the methylacetylene concentration of the reflux in this manner is highly advantageous. The vapor bleed stream taken off the reflux accumulator may conveniently be recycled to a point in the butadiene recovery system ahead of the extractive distillation system, usually to the light gas removal section of the plant whereby its butadiene content is saved.

The product butadiene substantially free from methylacetylene, and having a much lower methylacetylene concentration than it would have in the absence of the C₄ hydrocarbon selected from the group consisting of isobutane, isobutylene and butene-1, is withdrawn as a liquid from the fractionator at a point located between the points at which the feed and the reflux enter the column and substantially below the point of entry of reflux which is usually introduced on the top tray. This product contains at least 99 per cent butadiene and not more than 0.05 per cent methylacetylene. In fact the methylacetylene content of the product is preferably not more than 0.01 per cent and in some cases it is so low that it is not detectable by present analytical methods.

The purity of the product (concentration of butadiene and freedom from methylacetylene) and the point of product drawoff may vary somewhat depending upon other conditions of operation including size of column, number of plates, rate of feed, temperature of top and bottom, amount of methylacetylene in the feed, amount of isobutane, isobutylene or butene-1 present, point or points of introduction of isobutane, isobutylene or butene-1, wishes of operator, and possibly other factors. I prefer to employ a 120-tray column for making the separation and to withdraw the butadiene product as a liquid side stream from a tray ranging from the 90th to the 115th from the bottom. With the feed entering at the 58th tray of such a column I have found it convenient to draw off the product at the 101st tray since this ensures adequate freedom not only from methylacetylene but also from the isobutane, isobutylene, or butene-1 and also from hydrocarbons heavier than butadiene. One advantage of my invention is that in many cases if desired the butadiene product may be taken off at a point even nearer the top of the column than would be the case in the absence of the lower-boiling more saturated $C_4$ hydrocarbon and still meet specifications as to methylacetylene content and at the same time be even freer from hydrocarbon heavier than butadiene. Another advantage is that a smaller column or a column having fewer trays or a smaller reflux ratio can often be employed to attain a given degree of separation.

Generally speaking, I withdraw the butadiene product from the column at that point where the liquid on the tray has the highest concentration of butadiene and the lowest concentration of methylacetylene, or at the point where these conditions are most nearly attained. The selection of a suitable drawoff point for the product will be obvious to those skilled in the art in the light of this disclosure.

It is to be understood that as the more saturated $C_4$ hydrocarbon I may employ isobutane alone, isobutylene alone, or butene-1 alone, or mixtures of any two or more thereof in any combination and proportions, such as mixtures of isobutane and isobutylene, isobutane and butene-1, isobutylene and butene-1, or mixtures of all three. It is also to be understood that while all three of these hydrocarbons exhibit the phenomenon of markedly increasing the relative volatility of methylacetylene above its expected value, they are far from absolute equivalents, one of the other, because as is borne out by the laboratory data given above they are not all equally effective.

The amount of the more saturated $C_4$ hydrocarbon boiling below butadiene present in the column may vary widely depending upon many factors including the amount of methylacetylene in the feed, the point or points of introduction of the more saturated hydrocarbon, the purity of product butadiene desired, the point of product drawoff, etc. Those skilled in the art will be enabled to select the correct amount of the more saturated $C_4$ hydrocarbon in the light of this disclosure. I prefer to employ a considerable molar excess of the more saturated $C_4$ hydrocarbon over the methylacetylene. The molar ratio of the more saturated $C_4$ hydrocarbon to methylacetylene may range from 1 to 1 up to 20 to 1 or even higher. The amount of methylacetylene in the feed will seldom exceed 0.5 mole per cent of the feed and more commonly it will be not over 0.1 mole per cent. In some cases the amount of more saturated $C_4$ hydrocarbon present will not exceed a few mole per cent of the total hydrocarbons present. Use of such small amounts is advantageous because it reduces the amount of the more saturated $C_4$ hydrocarbon in the butadiene product drawoff so that the desired purity of at least 99 per cent is readily obtained. It will be understood that if impurities are present in the butadiene, it is desirable that they not be acetylenes. Butylenes are less undesirable impurities than acetylenes, and butane (in this case isobutane) still less undesirable. Thus if is is necessary that up to 1 per cent of impurities be present in the butadiene, it is preferable that these impurities take the least objectionable form.

The amount of the more saturated $C_4$ hydrocarbon may range from the small amount required to show a substantial increase in the relative volatility of the methylacetylene up to an amount such as to give a molar concentration of the more saturated $C_4$ hydrocarbon in the liquid on the trays of the fractionator equal to that of the butadiene, or even higher.

In general neither too much nor too little of the more saturated $C_4$ hydrocarbon should be present. If too much is present, the product purity is too low. If too little is present the methylacetylene is not adequately removed from the butadiene. The amount should be just sufficiently great that methylacetylene removal is substantially improved, and preferably such that it is substantially complete, but not substantially in excess of that required to effect virtually complete removal.

One advantage of employing isobutane in particular in the practice of my invention is that it is so highly effective that less is required to effect a given degree of separation of methylacetylene from butadiene. Furthermore isobutane is much more easily separated by fractionation from butadiene than butene-1 or isobutylene so that there is less tendency for isobutane to appear in the product butadiene. Still another advantage is that isobutane is very unobjectionable as an impurity in butadiene, so that the more of the allowable 1 per cent of impurity that is isobutane the better.

Since the added more saturated $C_4$ hydrocarbon boils below butadiene, it will tend to appear in the overhead product rather than in the butadiene product stream. If however some of it does appear in the product stream, no harm is done so long as the percentage of butadiene in the product drawoff is not reduced below the specification figure (which is usually 99.00 per cent).

My process is ordinarily carried out continuously with continuous introduction to the column of the feed and the more saturated $C_4$ hydrocarbon and continuous withdrawal of overhead vapor, butadiene product and bottoms product. However in some cases though very much less preferably, it may be operated in a discontinuous or batchwise manner. For example, the feed hydrocarbon and the more saturated $C_4$ hydrocarbon may be added to the kettle of a fractionating column and the methylacetylene taken off as an initial overhead product followed by the pure butadiene. Such a mode of operation would usually be employed only in the laboratory or in very small-scale or pilot plant work.

The operating conditions of reflux ratio, temperature and pressure employed in practicing the process of the present invention are those commonly used in the art of fractionating light hydrocarbons. In general the pressure may range from atmospheric to 300 p. s. i. a. However I prefer to use moderate superatmospheric pressures, say from 50 to 80 p. s. i. a. in order to permit the use of ordinary cooling water. A pressure of 70 p. s. i. a. is very satisfactory. Selection of column pressure fixes the temperature in the column. Ordinarily the kettle temperature ranges from 125 to 160° F. and the top temperature from 100 to 120° F.

I have described my invention with particular reference to a continuously operating column in which methylacetylene is separated overhead and butadiene as a side stream taken off near the top of the column from a bottoms product of hydrocarbon less volatile than butadiene, usually butene-2. That operation is the one where the problem solved by the present invention is most serious. However in its broader aspects the present invention is not limited to such an operation but covers broadly the improved method of expediting the separation of methylacetylene from butadiene by fractionally distilling a mixture of butadiene and methylacetylene in the presence of isobutane, isobutylene or butene-1 in an amount at least sufficient substantially to enhance the relative volatility of the methylacetylene and thereby taking overhead a fraction of methylacetylene and said isobutane, isobutylene or butene-1, and allowing the major part or substantially all of said butadiene either to remain in the bottoms product or to be withdrawn at a lower point in the column, i. e., as a sidestream.

In a process wherein methylacetylene is taken overhead and butadiene remains in the bottoms product it may often be desirable to use an excess of the C₄ hydrocarbon boiling below butadiene and more saturated than butadiene over the amount required to effect separation overhead of the methylacetylene content of the feed. Such an excess may be taken overhead or may be allowed to remain simply in the bottoms or kettle of the still. Use of such an excess may be desirable as further insuring complete separation between methylacetylene and the butadiene. In a batch operation use of such an excess is especially desirable because it enables absolutely complete separation of methylacetylene from the butadiene, because the latter will not start to go overhead until after the plateau of the lower-boiling more saturated hydrocarbon (isobutane, isobutylene or butene-1) has been entirely traversed. In a continuous operation analogous considerations apply. However, it will be obvious that the present invention is not based simply on the use of hydrocarbon of intermediate boiling point but is based on the discovery that the isobutane, isobutylene or butene-1 actually enhances the relative volatility of the methylacetylene very markedly above its calculated value so that it is volatilized more readily and so more easily separated overhead.

Referring to the drawing, liquid feed enters the fractionator 1 via line 2. This feed is composed mainly of butene-2 and butadiene with a small amount of methylacetlylene. If it contains an insufficient amount of isobutane, isobutylene or butene-1, a suitable amount of such hydrocarbon may be added to the feed via line 3. Or such hydrocarbon may be introduced to the column by means of line 4 and any or all of the multiple injection lines shown as connecting line 4 to column 1. Column 1 is conveniently a 120-tray fractionator equipped with the usual trays and reboiling arrangement and with the overhead vapor condenser 5 and reflux accumulator 6. The liquid bottoms product leaving via line 7 consists essentially of butene-2 and a small amount of butadiene. The overhead vapors are partially condensed and passed to accumulator 6 whence a portion of the liquid condensate is returned via line 8 to the top of column 1 as reflux, entering on the top tray. A vapor bleed stream consisting of methylacetylene, butadiene and the more saturated C₄ hydrocarbon is withdrawn via line 9 for recycle to the light gas removal section of the butadiene plant. The balance of the liquid condensate not required for reflux is withdrawn via line 10 whence it may be recycled to a part of the plant ahead of the furfural absorber, say to the depropanizer, for recovery of the butadiene content thereof.

The liquid butadiene product which contains at least 99 per cent butadiene and not over 0.05 per cent, and preferably not over 0.01 per cent, of methylacetylene is withdrawn from the column 1 via line 11 located at a point below the top of the column. Withdrawal of a portion of the liquid condensate via line 10 is generally necessary in order to prevent impurities from pyramiding and lowering the butadiene purity below specification value.

Isobutane is by far the preferred agent for the practice of the present invention because it boils sufficiently below butadiene to be readily separable therefrom either in the same or in a subsequent fractionation. For example where methylacetylene is separated as an overhead fraction from butadiene as a side stream product and from butene-2 as a bottoms product, it is an easy matter to so operate the column that the butadiene product is not only free from methylacetylene but is also adequately free from butene-2 and isobutane. Isobutane is preferred for the additional reason that a given amount of isobutane is much more effective for the purpose at hand than either isobutylene or butene-1. It is also preferred because, being a paraffin, it is inert so that small amounts do not interfere with the step of making synthetic rubber from the butadiene product as would be the case where the impurity in the butadiene is an olefin or an acetylene.

From the foregoing it will be seen that the present invention provides a simple and highly advantageous method of separating methylacetylene from butadiene. It provides a method of recovering butadiene of specification grade from a stream containing same together with at least one heavier hydrocarbon such as butene-2 and methylacetylene in amount such that if conventional fractionation were employed the butadiene recovered overhead would need to be fractionated in a separate column at considerable trouble and expense in order to remove the methylacetylene. Thus the process of the invention very effectively solves the problem which frequently confronts butadiene manufacturers who employ conventional final fractionation of butadiene in the presence of methylacetylene, especially fractionation of butadiene from butene-2 in the presence of this acetylene. A great many other advantages of the process of my invention will be at once apparent to skilled workers in the art.

I claim:

1. The process of removing methylacetylene from butadiene which comprises fractionally distilling butadiene containing methylacetylene in the presence of an aliphatic C₄ hydrocarbon more saturated than and lower boiling than butadiene in a molar ratio of said more saturated C₄ hydrocarbon to methylacetylene of at least 1:1, taking overhead a fraction containing methylacetylene and said more saturated C₄ hydrocarbon and recovering a methylacetylene-free fraction containing butadiene and higher boiling than said first named fraction.

2. A process according to claim 1 wherein the C₄ hydrocarbon more saturated than and lower boiling than butadiene is isobutane.

3. A process according to claim 1 wherein the C₄ hydrocarbon more saturated than and lower boiling than butadiene is isobutylene.

4. A process according to claim 1 wherein the C₄ hydrocarbon more saturated than and lower boiling than butadiene is butene-1.

5. The process of recovering butadiene substantially free from methylacetylene from a hydrocarbon feed containing butadiene, methylacetylene and at least one hydrocarbon less volatile than butadiene in the same fractionating column wherein said butadiene is separated from said less volatile hydrocarbon, which comprises introducing said feed into a fractionating column at an intermediate point therein and fractionally distilling same therein in the presence of an aliphatic C₄ hydrocarbon more saturated than and lower-boiling than butadiene in amount at least sufficient substantially to enhance the relative volatility of the methylacetylene, withdrawing from said column a bottoms product of said less volatile hydrocarbon and an overhead vapor containing substantially all of the methylacetylene contained in said feed, said more saturated lower-boiling hydrocarbon and some butadiene, at least partially condensing said overhead and returning a portion of the condensate to the top of said column as reflux therefor, and withdrawing a liquid butadiene product substantially free from methylacetylene at a point in said column intermediate the points at which the feed and reflux enter the same.

6. The process of recovering butadiene substantially free from methylacetylene from a hydrocarbon feed containing butadiene, methylacetylene and butene-2 in the same fractionating column wherein said butadiene is separated from said butene-2, which comprises introducing said feed into a fractionating column at an intermediate point therein and fractionally distilling same therein in the presence of an aliphatic C₄ hydrocarbon more saturated than and lower-boiling than butadiene in amount at least sufficient substantially to enhance the relative volatility of the methylacetylene, withdrawing from said column a bottoms product of said butene-2 and an overhead vapor containing substantially all of the methylacetylene contained in said feed, said more saturated lower-boiling hydrocarbon and some butadiene, at least partially condensing said overhead and returning a portion of the condensate to the top of said column as reflux therefor, and withdrawing a liquid butadiene product containing at least 99 per cent of butadiene and substantially free from methylacetylene at a point in the upper part of said column but substantially below the point at which the reflux enters same.

7. The process of recovering butadiene substantially free from methylacetylene from a hydrocarbon feed containing butadiene, methylacetylene and butene-2 in the same fractionating column wherein said butadiene is separated from said butene-2, which comprises introducing said feed into a fractionating column at an intermediate point therein and fractionally distilling same therein in the presence of isobutane in amount at least sufficient substantially to enhance the relative volatility of the methylacetylene, withdrawing from said column a bottoms product of said butene-2 and an overhead vapor containing substantially all of the methylacetylene contained in said feed, isobutane and some butadiene, at least partially condensing said overhead and returning a portion of the condensate to the top of said column as reflux therefor, and withdrawing a liquid butadiene product containing at least 99 per cent of butadiene and substantially free from methylacetylene at a point in the upper part of said column but substantially below the point at which the reflux enters same.

8. The process of recovering butadiene substantially free from methylacetylene from a hydrocarbon feed containing butadiene, methylacetylene and butene-2 in the same fractionating column wherein said butadiene is separated from said butene-2, which comprises introducing said feed into a fractionating column at an intermediate point therein and fractionally distilling same therein in the presence of isobutylene in amount at least sufficient substantially to enhance the relative volatility of the methylacetylene, withdrawing from said column a bottoms product of said butene-2 and an overhead vapor containing substantially all of the methylacetylene contained in said feed, isobutylene and some butadiene, at least partially condensing said overhead and returning a portion of the condensate to the top of said column as reflux therefor, and withdrawing a liquid butadiene product containing at least 99 per cent of butadiene and substantially free from methylacetylene at a point in the upper part of said column but substantially below the point at which the reflux enters same.

9. The process of recovering butadiene substantially free from methylacetylene from a hydrocarbon feed containing butadiene, methylacetylene and butene-2 in the same fractionating column wherein said butadiene is separated from said butene-2, which comprises introducing said feed into a fractionating column at an intermediate point therein and fractionally distilling same therein in the presence of butene-1 in amount at least sufficient substantially to enhance the relative volatility of the methylacetylene, withdrawing from said column a bottoms product of said butene-2 and an overhead vapor containing substantially all of the methylacetylene contained in said feed, butene-1 and some butadiene, at least partially condensing said overhead and returning a portion of the condensate to the top of said column as reflux therefor, and withdrawing a liquid butadiene product containing at least 99 per cent of butadiene and substantially free from methylacetylene at a point in the upper part of said column but substantially below the point at which the reflux enters same.

10. The process of recovering butadiene substantially free from methylacetylene from a hydrocarbon feed containing butadiene, methylacetylene and butene-2 in the same fractionating column wherein said butadiene is separated from said butene-2, which comprises introducing said feed into a fractionating column at an intermediate point therein and fractionally distilling same therein in the presence of an aliphatic C₄ hydrocarbon more saturated than and lower-boiling than butadiene in amount at least sufficient substantially to enhance the relative volatility of the methylacetylene, withdrawing from said column a bottoms product of said butene-2 and an overhead vapor containing substantially all of the methylacetylene contained in said feed, said more saturated lower-boiling hydrocarbon and some butadiene, partially condensing said overhead to form a liquid condensate and a vaporous fraction which is much higher in methylacetylene concentration than either the overhead vapor or said condensate, withdrawing said vaporous fraction from the system, returning a portion of the condensate to the top of said column as reflux therefor, withdrawing the remainder of said condensate from the system in amount sufficient to prevent non-butadiene impurities from pyramiding in the column, and withdrawing a liquid butadiene product containing at least 99 mol per cent butadiene and not more than 0.05 mol per cent of methylacetylene at a point in the upper portion of said column adjacent the top thereof but substantially below the point at which the reflux enters same.

11. The process of recovering butadiene substantially free from methylacetylene from a hydrocarbon feed containing butadiene, methylacetylene and butene-2 in the same fractionating column wherein said butadiene is separated from said butene-2, which comprises introducing said feed into a fractionating column at an intermediate point therein and fractionally distilling same therein in the presence of isobutane in amount at least sufficient substantially to enhance the relative volatility of the methylacetylene, withdrawing from said column a bottoms product of said butene-2 and an overhead vapor containing substantially all of the methylacetylene contained in said feed, said isobutane and some butadiene, partially condensing said overhead to form a liquid condensate and a vaporous fraction which is much higher in methylacetylene concentration than either the overhead vapor or said condensate, withdrawing said vaporous fraction from the system, returning a portion of the condensate to the top of said column as reflux therefor, withdrawing the remainder of said condensate from the system in amount sufficient to prevent non-butadiene impurities from pyramiding in the column, and withdrawing a liquid butadiene product containing at least 99 mol per cent butadiene and not more than 0.05 mol per cent of methylacetylene at a point in the upper portion of said column adjacent the top thereof but substantially below the point at which the reflux enters same.

12. The process of recovering butadiene substantially free from methylacetylene from a hydrocarbon feed containing butadiene, methylacetylene and butene-2 in the same fractionating column wherein said butadiene is separated from said butene-2, which comprises introducing said feed into a fractionating column at an intermediate point therein and fractionally distilling same therein in the presence of isobutylene in amount at least sufficient substantially to enhance the relative volatility of the methylacetylene, withdrawing from said column a bottoms product of said butene-2 and an overhead vapor containing substantially all of the methylacetylene contained in said feed, said isobutylene and some butadiene, partially condensing said overhead to form a liquid condensate and a vaporous fraction which is much higher in methylacetylene concentration than either the overhead vapor or said condensate, withdrawing said vaporous fraction from the system, returning a portion of the condensate to the top of said column as reflux therefor, withdrawing the remainder of said condensate from the system in amount sufficient to prevent non-butadiene impurities from pyramiding in the column, and withdrawing a liquid butadiene product containing at least 99 mol per cent butadiene and not more than 0.05 mol per cent of methylacetylene at a point in the upper portion of said column adjacent the top thereof but substantially below the point at which the reflux enters same.

13. The process of recovering butadiene substantially free from methylacetylene from a hydrocarbon feed containing butadiene, methylacetylene and butene-2 in the same fractionating column wherein said butadiene is separated from said butene-2, which comprises introducing said feed into a fractionating column at an intermediate point therein and fractionally distilling same therein in the presence of butene-1 in amount at least sufficient substantially to enhance the relative volatility of the methylacetylene, withdrawing from said column a bottoms product of said butene-2 and an overhead vapor containing substantially all of the methylacetylene contained in said feed, said butene-1 and some butadiene, partially condensing said overhead to form a liquid condensate and a vaporous fraction which is much higher in methylacetylene concentration than either the overhead vapor or said condensate, withdrawing said vaporous fraction from the system, returning a portion of the condensate to the top of said column as reflux therefor, withdrawing the remainder of said condensate from the system in amount sufficient to prevent non-butadiene impurities from pyramiding in the column, and withdrawing a liquid butadiene product containing at least 99 mol per cent butadiene and not more than 0.05 mol per cent of methylacetylene at a point in the upper portion of said column adjacent the top thereof but substantially below the point at which the reflux enters same.

14. The process of recovering butadiene substantially free from methylacetylene from a hydrocarbon feed containing butadiene, methylacetylene and butene-2 in the same fractionating column wherein said butadiene is separated from said butene-2, which comprises introducing said feed into a fractionating column at an intermediate point therein and fractionally distilling same therein in the presence of an aliphatic $C_4$ hydrocarbon more saturated than and lower-boiling than butadiene in amount at least sufficient substantially to enhance the relative volatility of the methylacetylene, withdrawing from said column a bottoms product of said butene-2 and an overhead vapor containing substantially all of the methylacetylene contained in said feed, said more saturated lower-boiling hydrocarbon and some butadiene, partially condensing said overhead to form a liquid condensate and a vaporous fraction which is much higher in methylacetylene concentration than either the overhead vapor or said condensate, withdrawing said vaporous fraction from the system, returning a portion of the condensate to the top of said column as reflux therefor, withdrawing the remainder of said condensate from the system in amount sufficient to prevent non-butadiene impurities from pyramiding in the column, and withdrawing a liquid butadiene product containing at least 99 mol per cent butadiene and not more than 0.01 mol per cent of methylacetylene at a point in the upper portion of said column adjacent the top thereof but substantially below the point at which the reflux enters same.

15. The process of recovering butadiene substantially free from methylacetylene from a hydrocarbon feed containing butadiene, methylacetylene and butene-2 in the same fractionating column wherein said butadiene is separated from said butene-2, which comprises introducing said feed into a fractionating column at an intermediate point therein and fractionally distilling same therein in the presence of an aliphatic $C_4$ hydrocarbon more saturated than and lower-boiling than butadiene in amount substantially in molar excess of the methylacetylene, withdrawing from said column a bottoms product of said butene-2 and an overhead vapor containing substantially all of the methylacetylene contained in said feed, said more saturated lower-boiling hydrocarbon and some butadiene, at least partially condensing said overhead and returning a portion of the condensate to the top of said column as reflux therefor, and withdrawing a liquid butadiene product containing at least 99 per cent of butadiene and substantially free from methylacetylene at a point in the upper part of said column but substantially below the point at which the reflux enters same.

16. The process of claim 6 wherein said aliphatic $C_4$ hydrocarbon is introduced into said column at the same level as said feed.

17. The process of claim 6 wherein said aliphatic $C_4$ hydrocarbon is introduced into said column at a plurality of points lying between the point of feed entry and a point adjacent but substantially below the point at which said liquid butadiene product is withdrawn.

MAURICE R. DEAN.

REFERENCES CITED

The following references are of record in the file of this patent:

UNITED STATES PATENTS

| Number | Name | Date |
|---|---|---|
| 2,371,860 | Walls et al. | Mar. 20, 1945 |
| 2,382,603 | Buell | Aug. 14, 1945 |
| 2,415,006 | Hackmuth | Jan. 28, 1947 |